United States Patent

[11] 3,588,898

[72] Inventors Edward C. Watters, Jr.
  Annapolis;
  Thomas M. Moore, Severna Park, both of Md.
[21] Appl. No. 772,701
[22] Filed Nov. 1, 1968
[45] Patented June 28, 1971
[73] Assignee Westinghouse Electric Corporation
  Pittsburgh, Pa.

[54] APPARATUS AND METHOD FOR IMPROVING THE VELOCITY RESPONSE OF A MTI RADAR BY SINUSOIDALLY VARYING THE INTERPULSE PERIOD
19 Claims, 5 Drawing Figs.

[52] U.S. Cl. .................................................. 343/7.7,
  343/17.1
[51] Int. Cl. .................................................. G01s 9/42
[50] Field of Search .......................................... 343/7.7,
  17.1 (PRF)

[56] References Cited
UNITED STATES PATENTS
3,480,953  11/1969  Shreve ........................ 343/7.7

Primary Examiner—Rodney D. Bennett, Jr.
Assistant Examiner—T. H. Tubbesing
Attorneys—F. H. Henson and E. P. Klipfel ABSTRACT: A variable pulse-repetition frequency generator for moving target indicator radars wherein the time interval between radar transmissions is controlled in a sinusoidal manner to eliminate blind speeds for MTI operation while providing maximum clutter cancellation capability.

PATENTED JUN 28 1971    3,588,898

INVENTORS
Edward C. Watters, Jr. &
Thomas M. Moore.
BY Ernst P. Kipfel
ATTORNEY

APPARATUS AND METHOD FOR IMPROVING THE VELOCITY RESPONSE OF A MTI RADAR BY SINUSOIDALLY VARYING THE INTERPULSE PERIOD

CROSS-REFERENCE TO RELATED APPLICATIONS

Reference is made to a copending application entitled "Apparatus for Flexibly Weighting Received Echos in a Moving Target Indicator Radar," Ser. No. 776,410, filed Nov. 18, 1968, by John W. Taylor, Jr. and another copending application entitled "An MTI Radar System Utilizing Unique Patterns of Interpulse Period Choices to Simplify Weighting Coefficients for Individual Echo Pulses," Ser. No. 776,409, filed Nov. 18, 1968, by John W. Taylor, Jr. each of which are assigned to the common assignee of this application.

BACKGROUND OF THE INVENTION

1. Field of the Invention

The present invention relates to moving target indicator (MTI) radars and more particularly relates to apparatus and method for controlling the pulse-repetition frequency (PRF) of a radar to eliminate blind speeds.

2. Description of the Prior Art

One of the major drawbacks of MTI radar systems is the occurrence of blind speeds or velocities when target Doppler frequencies are multipliers of the PRF frequency. Under these conditions, the phase of the target return reoccurs at the sample rate and the changing phase condition necessary for detection does not occur.

In the past, the blind speed problem has been attacked by the use of "staggered" PRF's in which two different trigger spacings are alternated on a pulse to pulse basis. By selecting appropriate spacings this system will eliminate or reduce the first few blind speed notches from the response, but if reasonable separations are used the cyclic reoccurrence of the spacings will produce blind speeds at the higher harmonics of the original blind Doppler.

Recent advances in digital MTI techniques have presented the possibility of complete freedom of PRF spacings since the equipment is not tied down to fixed delay times when storage is accomplished digitally rather than in quartz delay lines. This advance has allowed the institution of continuously variable PRF's such as a sawtooth characteristic. In such a system of the prior art, a fixed number is added to a basic separation time counter for each PRF. The adders are accumulated until a certain separation is reached and the system will return to the basic separation time. This system produces a phase response which is the average of a large number of different time intervals and can eliminate all the blind speeds of interest.

The difficulty with the sawtooth PRF system is in the discontinuous function when a maximum separation returns to a minimum. This discontinuity fills in the near zero speed notch necessary for clutter cancellation and reduces the overall cancellation capability of the system. The effect can be reduced by a triangular PRF approach which sums up to maximum and then subtracts equal increments down to minimum, but the discontinuous slopes at the changeover points still reduce the maximum capability of the system.

SUMMARY OF THE INVENTION

An object of the present invention is to provide apparatus and method for reducing the discontinuities associated with the triangular system.

Another object of the present invention is to provide apparatus and method for reducing the discontinuities associated with the triangular system and allowing a maximum cancellation capability on clutter with no blind speeds for targets.

Another object of the present invention is to provide apparatus and method for providing blind speed free MTI operation with optimum cancellation characteristics in a radar system.

If it were possible to continuously increase the PRF interval by a constant amount a perfect system would result, but this is an impossibility since the time between pulses would approach infinity and no information would be gathered.

Briefly, the present invention accomplishes the above cited objects and other objects and advantages by providing a time clock counter which runs from a continuously running timing clock and which counts the time elapsed from the last pulse which occurred. The count is compared to a selected PRF separation in a count comparator. When the digital word in the time clock counter agrees with the word stored in a PRF buffer store, a PRF trigger pulse is generated. The time separation words stored in the PRF buffer store are selected to provide a desired time separation between pulses of a cycle which is sinusoidally varying. The PRF trigger pulse controls the radar system timing, resets the time clock counter to zero, resets the buffer PRF store to zero, and, after delay for buffer clearing, updates the address and store generator. A new PRF time separation word is read into the buffer store by means of a PRF selection gating circuit.

BRIEF DESCRIPTION OF THE DRAWINGS

Further objects and advantages of the present invention as well as the operation of the aforementioned circuits will be more readily apparent from the following detailed description taken in conjunction with the drawings, in which.

Figure 1:
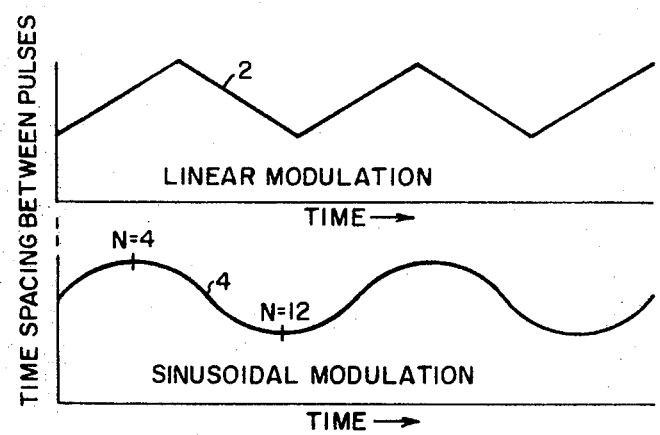
FIG. 1 is a graphical comparison of the time spacing between pulses when utilizing linear modulation of the prior art and the sinusoidal modulation of the present invention.

The following analysis is presented for a clearer understanding of the operation and theory of the present invention and to verify that a sinusoidal interpulse period for an MTI radar is optimal.

As is well known, an MTI radar uses the Doppler frequency shift to distinguish fixed from moving targets. The extraction of Doppler allows the radar to detect the presence of a moving target even when the return signal from the fixed target is several orders of magnitude greater. The return signals from fixed targets are called clutter and generally constitute unwanted information in normal radar applications.

Unfortunately, some moving targets may have a velocity which results in a target phase shift of 360° between successive radar transmissions. To overcome these blind velocities the interpulse period between successive radar transmissions is varied. The receiver phase detector then has more of an opportunity to detect Doppler shifts of the moving targets. If the received echoes are given weighted consideration the moving target can be more readily extracted from the clutter background.

The signal returned on the Kth pulse of a cycle by a constant speed target may be represented by:

$$S_K = j(K+E_K)v \quad (1)$$

where $v$ is the normalized velocity and $E_K$ represents the relative time deviation of the transmitted pulse from a fixed clock. For further purpose of clarity the case of a 4 pulse binomial weighted canceller will be considered. The Kth output, $I_K$, from such a canceller is designated:

$$I_K = S_K - 3S_{K１１} + 3S_{K１２} - S_{K１３} \quad (2)$$

which will add up to zero when clutter is present and which may be rewritten by the substitution of equation (1) into equation (2) as follows:

$$I_K = _o{}^{:}(K-3+E_{K13})v\ [\,J(T_K+T_{K11}+T_{K12})v_{13eJ}(T_{K12}+T_{K11})v_{+3eJ}$$
$$(T_{K12}vay1_1)] \quad (3)$$

where the Kth normalized interpulse period, $T_K$, is represented by:

$$T_K = 1 + E_K - E_{K11}. \quad (4)$$

The canceller power output, $P_K$, on the Kth pulse may be represented by:

$$P_K = I_K I_K^* \quad (5)$$

where * indicates a complex conjugate. The average power over one variable PRF cycle is:

$$P = \frac{1}{N}\sum_{K=1}^{N} P_K \quad (6)$$

where N represents the number of different interpulse spacings used.

As mentioned previously the interpulse spacing sequence is normally repeated periodically; that is, it is cyclic in form and therefore can be represented by a Fourier Series, $$T_K = 1 + \sum_{n=1}^{N/2} a_n \cos \frac{2\pi n}{N} K \quad (7)$$

where, for simplicity, N is assumed even and only the cosine terms are used in the expansion. The presently unknown Fourier coefficients $a_n$ are selected in the ensuing analysis so as to yield optimal performance. Elimination of the first normal blind speed depends primarily on the ratio, R, of the maximum deviation over minimum deviation of the time between pulses from an average time. In other words the ratio:

$$\frac{\text{Max}\,(T_K)}{\text{Min}\,(T_K)} = R \quad (8)$$

The larger the ratio is chosen, the more effective is the elimination of the first blind speed. However the ratio R cannot be too large because of second time around echo problems as well as the necessity for providing a sufficiently wide notch at zero speed. A typical choice of the ratio R for illustrative purposes will be assumed to be 1.5. If it is assumed, as will be validated later, that:

$$\text{Max}(T_K) = T_o \quad (9)$$

and $$\text{Min}(T_K) = T_{N/2} \quad (10)$$

and specify the ratio R, the choice of the $a_n$'s is restricted by:

$$1 + \sum_{n=1}^{N/2} a_n - R\left[1 + \sum_{n=1}^{N/2}(-1)^n a_n\right] = 0. \quad (11)$$

since $$T_o = 1 + \sum_{n=1}^{N/2} a_n \text{ and } T_{N/2} = 1 + \sum_{n=1}^{N/2}(-1)^n a_n \text{ and } \frac{T_o}{T_{N/2}} = R.$$

Having set the maximum to minimum interpulse spacing ratio, R, the $a_n$'s are chosen so that the cancellation near zero speed is a maximum. Expanding the power of the Kth pulse, $P_K$, in a power series yields:

$$P_K = (T_K - 2T_{K11} + T_{K12})^2 v^2 + \text{higher order terms}. \quad (12)$$

For best cancellation near zero speed it is desirable to minimize the near zero speed power, $q$, where:

$$q = \frac{1}{N}\sum_{K=1}^{N-1}(T_K - 2T_{K-1} + T_{K-2})^2 \quad (13)$$

Substitution of the Fourier expansion for $T_K$ (Equation 7) yields:

$$q = \frac{16}{N}\sum_{K=1}^{N-1}\sum_{m=1}^{N/2}\sum_{n=1}^{N/2} a_n a_m \sin^2 \frac{\pi n}{N} \sin^2 \frac{\pi m}{N}$$
$$\cos \frac{2\pi n}{N}(K-1) \cos \frac{2\pi m}{E}(K-1). \quad (14)$$

By utilizing Lagrange's method of undetermined multipliers, it is easily shown that $q$ is a minimum for a specified ratio, R, when:

$$\frac{A_N}{2} \frac{R-1}{1-(-1)^{N/2}R} + \frac{2}{1-(-1)^{N/2}R}\sum_{m=1}^{N/2}[1-R(-1)^n]^2 \csc^4 \frac{\pi d}{N} \quad (15)$$

and $$a_n = 2\frac{an}{2}\frac{1-R(-1)^n}{1-4(-1)^{N/2}} \csc \frac{4\pi n}{N} \cdot n = 1, 2, \ldots, \frac{N}{2}-1. \quad (16)$$

These represent the optimal choices, for the Fourier coefficients $a_n$ and thus establish the optimal $T_K$'s by virtue of equation (7). For large numbers N of pulses occurring in a given cycle ($N \geq 16$) the coefficient $a_1$ is significantly larger than all other $a_n$'s. As a result the optimal choice for the Kth normalized interpulse period, $T_K$, is approximately:

$$T_K \approx 1 + a_1 \cos 2\frac{\pi K}{N} \quad (17)$$

By direct substitution:

$$\text{Max } T_K = T_o \text{ax} 1 + a_1 \quad (18)$$

and $$\text{Min } T_K = T_{N/2} = 1 - a_1, \quad (19)$$

to validate the previous assumption.

Referring to FIG. 1, waveform 2 illustrates the time spacing between pulses to be linearly modulated with a triangular waveform in accordance with the prior art. The waveform 4 in accordance with the present invention illustrates sinusoidal modulation of the time spacing between pulses.

The clutter spectrum to be rejected will have some finite width due to environmental conditions and radar scanning modulation. The ideal canceller rejection notch would provide zero response to the clutter spectrum and maximum response throughout the target velocities of interest. Thus, under ideal conditions, fixed targets exhibit no phase difference between successive radar returns and hence will be cancelled upon reception in the video subtraction process, while moving targets will not be cancelled.

Figure 2:
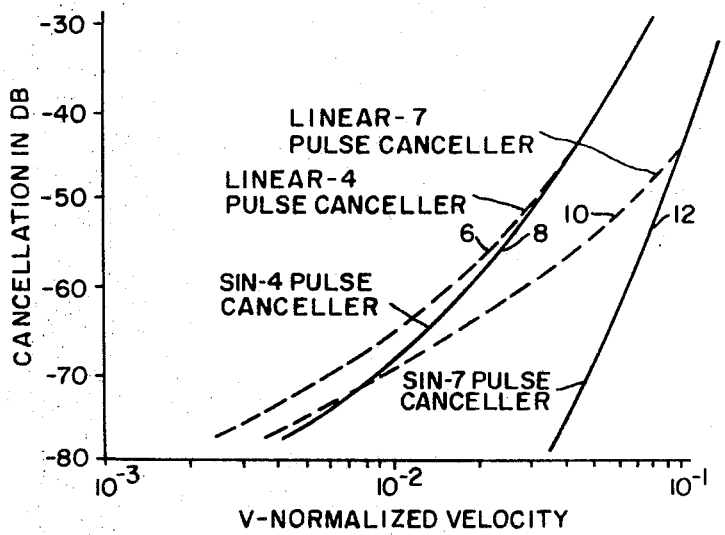
FIG. 2 is a graphical comparison of the improvements obtained over the prior art when practicing the present invention.

The improvement attainable when practicing the present invention over the linear modulation of the time spacing between pulses of the prior art is graphically illustrated in FIG. 2. With linear modulation and a 4 pulse canceller the average cancellation versus normalized velocity is illustrated by curve 6. The improvement utilizing sinusoidal modulation is apparent from curve 8. The superiority of sinusoidal modulation is more readily evident for higher order cancellers such as the linear modulation utilized with a 7 pulse canceller of curve 10 versus the sinusoidal modulation with the same order canceller shown as curve 12. The unit valve of normalized velocity, V=1, corresponds to the first blind speed at a fixed pulse-repetition frequency. In each instant the curves presented in FIG. 2 for comparison purposes is based on a ratio R=1.5 with 16 pulses or hits per PRF cycle. The cancellers in each instant utilize binomial weighted cancellers.

Figure 3:
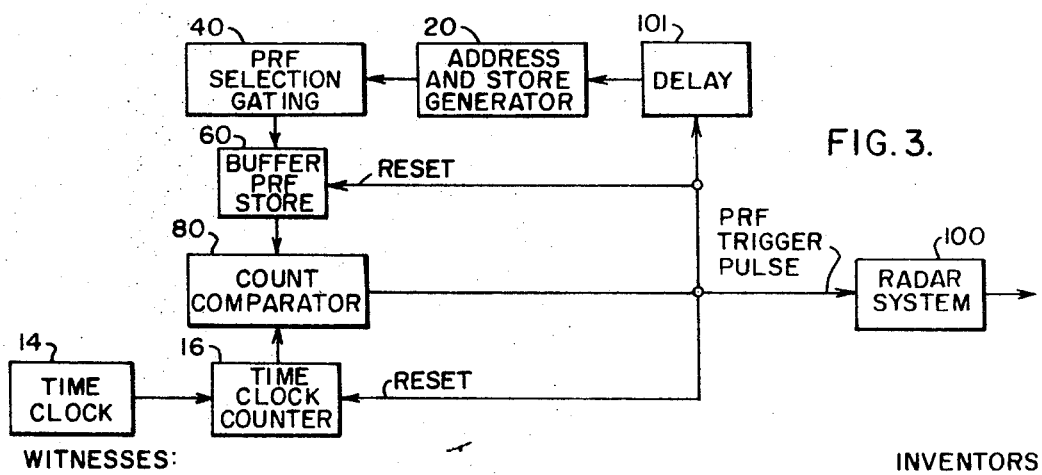
FIG. 3 is a schematic block diagram of an illustrative embodiment of the present invention.

A block diagram for the optimum variable PRF generator is shown in FIG. 3. It is to be understood that that which is variable is not the amplitude of the pulse radiated from the transmitter, which may or may not be varied, but rather the interpulse period or time elapsed between successive pulses emanating from the radar. Further, the PRF trigger pulse directed to the radar system for triggering such a pulse from the radar will be assumed to be such a pulse since the pulse radiating from the radar system will coincide or occur some fixed time after the occurrence of the PRF trigger pulse nomenclatured in FIG. 3.

In accordance with the present invention apparatus and method are provided to control the time interval between radar transmissions in a sinusoidal manner. A continuously running timing clock 14 is counted in the time clock counter 16. The counter 16 determines the elapsed time from the last radar transmission or pulse and accordingly counts the time intervals between pulses of a cycle. The desired time intervals to be varied sinusoidally is herein chosen to be illustrated to be in 16 segments over a cycle. Each time segment represents a selected PRF separation which is compared with the time elapsed from the last pulse.

An address and store generator 20 stores the desired time intervals in the form of time separation words. Each time separation word is selected by an address word. The desired PRF time separation word is read by a PRF selection gating circuit 40 into a buffer store 60. When the digital word in the time clock counter 16 is determined by the time elapsed from the previous pulse, agrees with the time separation word stored in the PRF buffer store 60, a PRF trigger pulse is generated by a count comparator 80.

As mentioned previously the PRF trigger signal controls the radar system timing and for purposes of simplicity the occurrence of the PRF trigger pulse is to be considered as likewise the occurrence of a radar transmission or at least such an occurrence with a prefixed time delay interval inherent in a radar system 100. The trigger pulse also resets the time clock counter 16 to zero, resets the buffer PRF store 60 to zero, and, after passing through a time delay 101 which permits buffer clearing, updates the address and store generator 20. A new PRF separation word is then read into the buffer store 60 by means of the PRF selection gating circuits 40.

More particularly, the detailed explanation of operation of these circuits will now be presented.

The variable interpulse period (VIP), in accordance with the present invention, is a cyclic function which will follow the general rule of the separation between pulses to vary sinusoidally about an average such that:

$$\text{Separation} = t_{avg}\left(1 + A \sin \frac{2\pi N}{K}\right) \quad (20)$$

where A is the maximum ± deviation from the average period or separation time, N is the sample number and K is the number of samples in the cycle. The value of K should be no greater than the number of pulses per radar beamwidth for best performance.

For example, to tabulate representative values for illustrative purposes:

$t_{avg} = A 1024$ counts of the time clock counter 16.
$A = 0.2$ which corresponds to a $t_{max}/t_{min} = 1.5$
$K =$ sixteen samples per cycle.

We have found that any rate appreciably less than the thousand or so counts of the counter 16 will not allow a good digital quantization of the desired sine function. Performance can be improved by using even more than the 11 prescribed bits. Further, while less than 16 samples per sinusoidal cycle could be utilized such an arrangement will not generally allow good cancellation. Of course, the more samples per cycle that are used will improve performance of the system.

If a sample point is established at the average value of the PRF period and at the maximum and minimum points a sample digital representation of the time intervals between pulses of a cycle will be as shown in Table I below:

TABLE I.—TIME CODE

| Samples N | PRF time separation word | Value of $1+A\sin\frac{2N}{K}$ | Address word | Address position |
|---|---|---|---|---|
| 0 | 10000000000 | 1.0000 | 000010000 | 5 |
| 1 | 10001001110 | 1.0765 | 000100000 | 6 |
| 2 | 10010010001 | 1.1414 | 001000000 | 7 |
| 3 | 10010111101 | 1.1845 | 010000000 | 8 |
| 4 | 10011001101 | 1.2000 | 100000000 | 9 |
| 5 | 10010111101 | 1.1845 | 010000000 | 8 |
| 6 | 10010010001 | 1.1414 | 001000000 | 7 |
| 7 | 10001001110 | 1.0765 | 000100000 | 6 |
| 8 | 10000000000 | 1.0000 | 000010000 | 5 |
| 9 | 01110110010 | 0.9235 | 000001000 | 4 |
| 10 | 01101101111 | 0.8586 | 000000100 | 3 |
| 11 | 01101000011 | 0.8155 | 000000010 | 2 |
| 12 | 01100110011 | 0.8000 | 000000001 | 1 |
| 13 | 01101000011 | 0.8155 | 000000010 | 2 |
| 14 | 01101101111 | 0.8586 | 000000100 | 3 |
| 15 | 01110110010 | 0.9235 | 000001000 | 4 |
| 16 | 10000000000 | 1.0000 | 000010000 | 5 |

From Table I, the sample point zero is set at the average PRF period with sample point 16 returning to the average point. Sample No. 4 is set at the maximum deviation from average and sample point 12 is set at the minimum time separation between pulses. The ratio R of maximum to minimum deviation is 1.5.

It can be seen that only nine separate values of time separation appear in the total time code cycle. Therefore a 9-bit up-down shift register 21 can be used to address the appropriate value of time.

Figure 4:
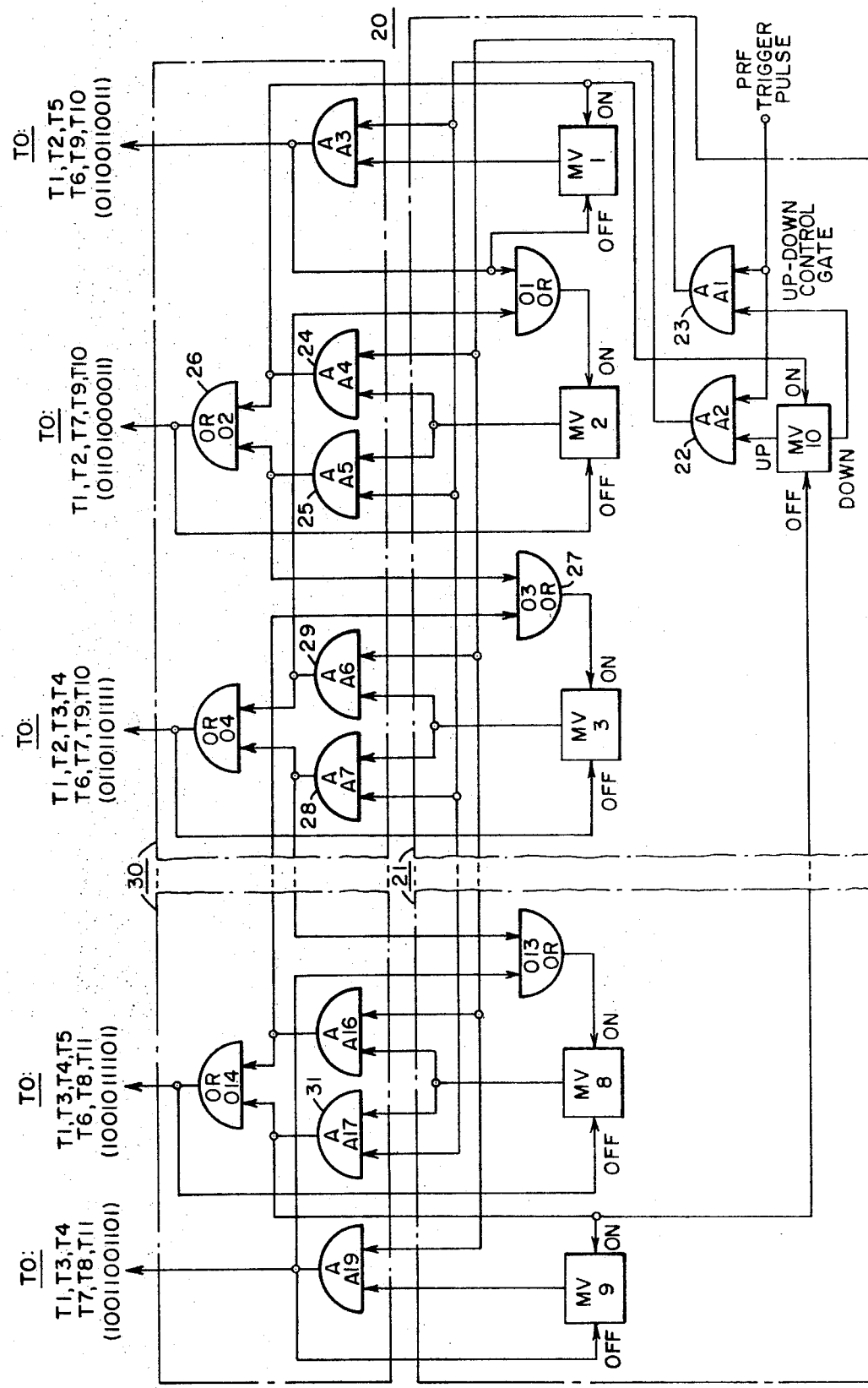
FIG. 4 is a logic block diagram of certain components illustrated in FIG. 3.

More particularly, the address and store generator 20 shown in FIG. 4 consists of 10 multivibrator circuits MV1 through MV10 with appropriate input and output gating. Circuits 4 through 7 are identical to circuit 3 and are omitted for purposes of simplicity. Each multivibrator MV is a two state device capable of being switched ON for a "1" condition at the primary output or OFF for a "0" condition at the primary output and a "1" at the secondary output thereof. Each multivibrator MV will remain in either condition until a trigger is applied to the opposite input to that last triggered multivibrator. Such multivibrators are well known to the art.

The multivibrator MV10 acts as an up-down control circuit to select the direction of shift of the single "1" in the register 21. The shifting of the single "1" in the register can be seen by reference to the address words tabulated in Table I. The selection of the address word is accomplished by gating the PRF trigger pulse with the primary output from the multivibrator MV10 in an AND gate 22 for an UP shift and the secondary output in an AND gate 23 for a DOWN shift.

If it is assumed that the address up-down register 21 is shifting UP (multivibrator MV10 in the ON condition) and the register 21 contains a "1" in the multivibrator MV2, the AND gate 22, and AND gate 24 and an AND gate 25 will be open. The next PRF trigger pulse will therefore pass through the AND gate 22 and AND gate 25 to OR gates 26 and 27. The OR gates 26 and 27 will pass the signal. The trigger from OR gate 26 will turn off the multivibrator MV2, closing the AND gates 24 and 25, and be passed to gates T1, T2, T7, T9, and T10 of the PRF selection gating circuits where the time separation word 01101000011 is generated in the buffer PRF store. The selection gating circuits and the buffer store will be more particularly described in relation to FIG. 5. At the moment however referring to FIG. 4 the output of the OR gate 27 will trigger the multivibrator MV3 ON and open AND gates 28 and 29. The AND gates 24, 25, 28 and 29 as well as the OR gate 26 are part of the storage of the desired sinusoidal separation function and in this instance are illustrated as a prewired store by the appropriate interconnection of AND gates and OR gates in the storage circuit 30 of the address and store generator 20.

For example, the next PRF time separation word is read out of the store 30 when the next PRF trigger pulse passes through the AND gate 28, turns off the multivibrator MV3, turns ON a multivibrator MV4 (not shown) and is fed to gates T1, T2, T3, T4, T6, T7, T9, and T10 to produce the word 01101101111. This process will continue with appropriate readout gating through multivibrator MV7 (not shown).

When the multivibrator MV8 is ON and the PRF trigger pulse passes through an AND gate 31, multivibrator MV8 will be turned off, multivibrator MV9 will be turned on and multivibrator MV10 will be turned off. This will close the AND gate 22 and open the AND gate 23 so that the register 21 will now shift DOWN. The next trigger pulse will turn off multivibrator MV9 and turn on the multivibrator MV8.

The "1" in the address word will continue to shift down the register 21 until the multivibrator MV1 is turned on at which time the multivibrator MV10 will also be turned on so that AND gate 23 closes and AND gate 22 opens and the register will again shift UP. The register 21 will continually shift in a cyclic manner. Appropriate biases must be applied to assure the insertion of a single "1" in the circuit 20 when the equipment is turned on for the first time.

Figure 5:
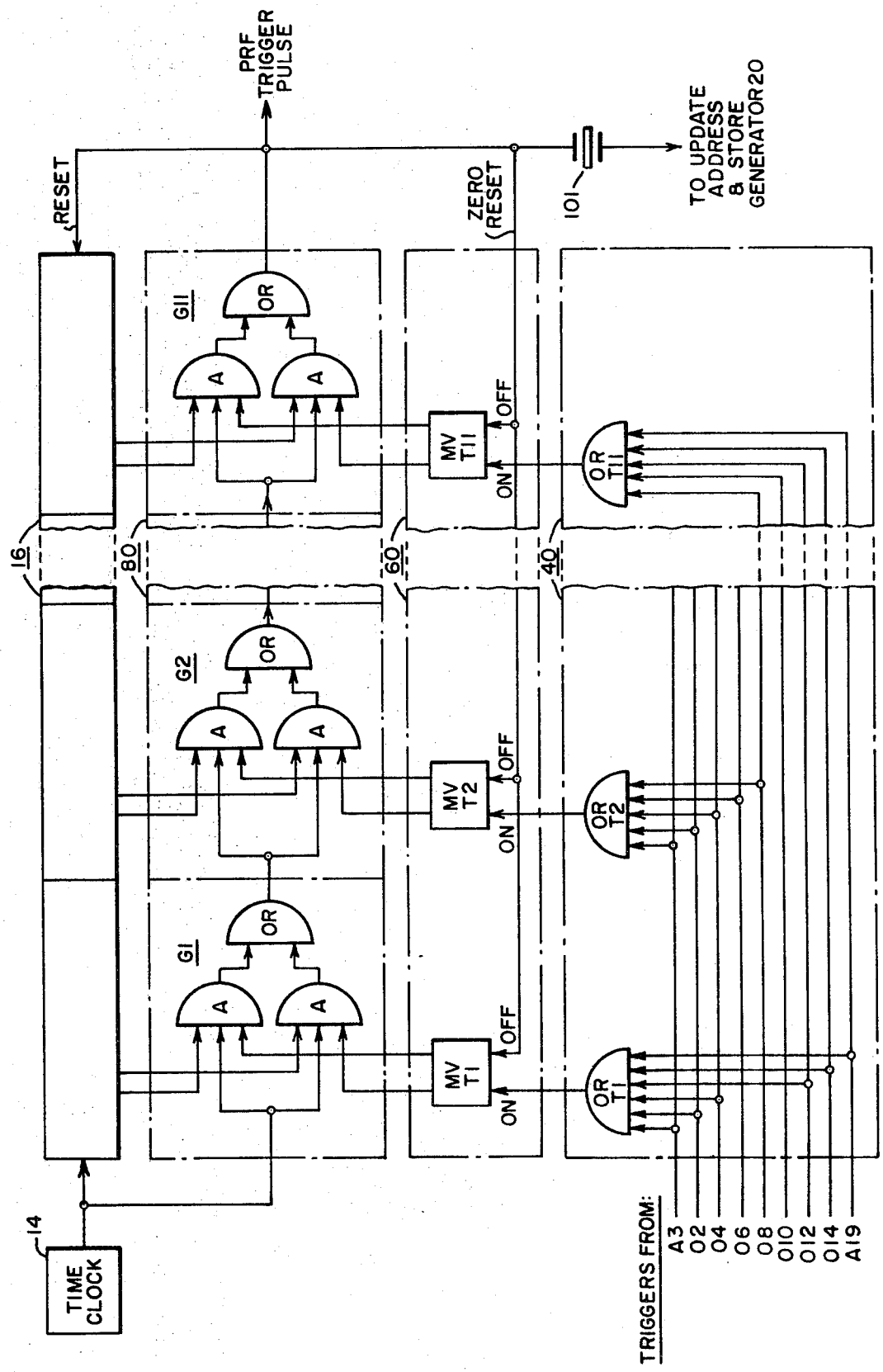
FIG. 5 is a logic block diagram of other components utilized in the illustrative embodiment of FIG. 3.

Trigger signals emanating from the address and store generator 20 are received by the PRF selection gating circuit 40. Referring to FIG. 5, the selection gating is accomplished by wiring OR gates T1 through T11 to receive appropriate trigger signals from the generator 20. Each position of the "1" in the address word corresponds to a unique time separation word as shown in Table I. Therefore a wired readout system is used which acts as a prewired store of the sinusoidal separation function. The circuitry for accomplishing this storage is shown in FIG. 5.

Each PRF trigger pulse resets the buffer PRF store 60 to the zero condition. The buffer store 60 comprises multivibrators MVT1 through MVT11 each having the usual on and off input terminals. The same trigger pulse is delayed slightly by the time delay 101 and fed to the address and store generator 20 where it will appear at the appropriate output. This output is wired to the corresponding PRF selection gates, T1 through T11. The output from the generator 20 will turn on the selected multivibrators MVT1 through MVT11 of the buffer store 60 to generate the appropriate time separation word input for the count comparator 80. Table I shows the correct counts of the buffer store 60 for each of the nine address conditions.

The count or time separation word in the buffer store 60 is compared to the continuing count in the conventional range clock counter 16 by gating circuits G1 through G11 in the count comparator 80. The comparator gates G1 through G11 are arranged so that a clock pulse will be passed if the corresponding clock counter stage and multivibrator are "1" or if both are "0" but not if the two are different. The gates G1 through G11 are arranged in series so that if all bits agree, the next clock pulse will pass all the way through the count comparator 80 and appear as a PRF trigger pulse at the output.

While the present invention has been described with a degree of particularity for the purposes of illustration, it is to be understood that all modifications, alterations or substitutions within the spirit and scope of the present invention are herein meant to be included. For example, while the illustrative embodiment has illustrated operation of the method by means of a ratio of maximum to minimum deviation of 1.5 and with 16 radar radiations or PRF trigger pulses per cycle, it is to be understood that logic networks accommodating other ratios or PRF cycles of other sampling rates may be readily accomplished. It is to be recognized that logic circuits may be fashioned in many ways to accomplish similar steps provided by the multivibrators, OR gates and AND gates of the illustrative embodiment.

Hence, it is readily apparent that the present invention will provide sinusoidally varying PRF time intervals with the attendant advantages of allowing blind speed free MTI operation with optimum cancellation characteristics.

We claim:

1. In an MTI radar system, the combination comprising; means for comparing the desired time separation between pulses of a cycle with the time elapsed from the last pulse to provide the next pulse; and means connected to said comparing means for establishing the desired time separation between pulses of a cycle to be sinusoidally varying.

2. The combination of claim 1 wherein the desired time separation between pulses of a cycle is sinusoidally varying from an average period between pulses.

3. The combination of claim 1 wherein said means for establishing the desired time separation between pulses of a cycle follow the general rule:

$$\text{Time Separation} = t_{avg}\left(1 + A \sin \frac{2\pi N}{K}\right)$$

where A is the maximum ± deviation from the average separation time, K is the number of time separation samples in a cycle and N is any particular time sample occurring in the cycle.

4. The combination as defined in claim 1 wherein said means for establishing said desired time separation includes means for storing time intervals indicia precalculated as a sine function of a maximum number.

5. The combination claimed in claim 4 wherein said means for storing time intervals indicia includes gating means prewired to store the sinusoidal separation function.

6. The combination of claim 4 wherein said indicia is in the form of time separation words, the combination further including means for addressing desired time separation words in said storing means.

7. The combination of claim 6 including means responsive to the last pulse for addressing the next desired time separation word.

8. The combination of claim 7 including buffer storage means for holding said next desired time separation word.

9. The combination of claim 8 including counter means for determining the time elapsed from the last pulse to occur.

10. The combination of claim 9 including time clock means for tolling real time.

11. The combination of claim 9 wherein said comparing means includes count comparator means for comparing the count of said counter means with the time separation word in said buffer storage means to locate the separation time position of the next-to-occur pulse in said cycle.

12. The combination as claimed in claim 11 including means responsive to the occurrence of a pulse in said cycle for resetting said counter means to zero, cancelling the time separation word stored in said buffer storage means and resetting said means for addressing to update said means for storing time intervals indicia to the next desired time separation word.

13. The combination as claimed in claim 12 including time delay means for allowing said buffer storage means to be cleared before the time separation word in said means to storing time intervals indicia is updated.

14. The combination as claimed in claim 12 including radar transmitter means for radiating a pulse repetition frequency signal upon the occurrence of each said pulse in said sinusoidal cycle.

15. The combination of claim 6 wherein said means for addressing includes an up-down register.

16. The combination of claim 15 including selection gating means for gating the time separation word determined by said up-down register through said gating means to be directed to said buffer storage means.

17. The combination of claim 15 wherein said buffer storage means includes a plurality of multivibrators each of which provides a digit for the count comparator means to compare with the digits generated by said time clock counter means.

18. In moving target indicator radar operation the method of controlling the radar transmissions so as to eliminate blind speeds while providing maximum clutter cancellation capability comprising, in combination; storing time separation words which vary sinusoidally, selecting a first time separation word, counting the elapsed time for the last radar transmission, comparing the elapsed time with the time separation word, providing another radar radiation upon said comparison having a predetermined relationship, and selecting the next time separation word.

19. In a moving target indicator radar, the method for controlling the radar transmission to eliminate blind speeds while providing maximum clutter cancellation capability comprising, in combination; generating a number of time separation indicia over a cycle which varies in a sinusoidal manner, counting the elapsed time from the last radar transmission, and comparing the count to the time separation indicia to provide for a sinusoidally varying of the time separation between radar transmissions.